(12) United States Patent
Wu et al.

(10) Patent No.: US 11,604,450 B1
(45) Date of Patent: Mar. 14, 2023

(54) PROCESSING MACHINE AND DETERMINING METHOD FOR DETERMINING ABNORMAL PROCESSING OF THE PROCESSING MACHINE

(71) Applicant: Delta Electronics, Inc., Taoyuan (TW)

(72) Inventors: Jia-Ming Wu, Taoyuan (TW); Chung-Chan Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/694,605

(22) Filed: Mar. 14, 2022

(30) Foreign Application Priority Data

Nov. 23, 2021 (CN) .......................... 202111411739.8

(51) Int. Cl.
*G05B 19/4065* (2006.01)
*B23Q 15/12* (2006.01)

(52) U.S. Cl.
CPC ......... *G05B 19/4065* (2013.01); *B23Q 15/12* (2013.01); *G05B 2219/34465* (2013.01)

(58) Field of Classification Search
None
See application file for complete search history.

(56) References Cited

U.S. PATENT DOCUMENTS 5,692,404 A 12/1997 Kirii et al.
5,724,843 A 3/1998 Kirii et al.
6,615,102 B1 9/2003 Morfino
2012/0095599 A1* 4/2012 Pak .................... B25J 9/1664
700/275

(Continued)

FOREIGN PATENT DOCUMENTS

CN 1086809 C 6/2002
CN 104154933 A 11/2014
CN 110597221 A 12/2019

(Continued)

OTHER PUBLICATIONS

Office Action dated Oct. 4, 2022 of the corresponding Taiwan patent application No. 110143536.

*Primary Examiner* — Ryan A Jarrett
(74) *Attorney, Agent, or Firm* — Chun-Ming Shih; HLDS IPR Services

(57) ABSTRACT

A method for determining an abnormal processing of a processing machine is disclosed, and includes: obtaining an acceleration signal corresponding to an acceleration of a tool tip from an accelerometer arranged on a tool-end of the processing machine; performing an integral process to the acceleration signal to generate a movement information; obtaining a motor position information of a motor used to bring the tool-end to move; respectively performing a coordinate alignment process to the movement information and the motor-position information to generate a transformed movement information and a position vector respectively being described based on a workpiece-end coordinates system used by a workpiece-end of the processing machine; combining the transformed movement information and the position vector to generate a relative movement value between the tool tip and the workpiece-end; and, determining whether an abnormal processing occurs based on the relative movement value.

10 Claims, 10 Drawing Sheets

(56) References Cited

U.S. PATENT DOCUMENTS

2018/0272491 A1  9/2018 Yang et al.
2021/0331313 A1  10/2021 Klingensmith

FOREIGN PATENT DOCUMENTS

| EP | 1097410 B1 | 4/2002 |
|---|---|---|
| JP | 3231536 B2 | 11/2001 |
| TW | 286359 B | 9/1996 |
| TW | 201633024 A | 9/2016 |
| TW | 201834784 A | 10/2018 |
| TW | 201943492 A | 11/2019 |
| WO | 0003312 A1 | 1/2000 |
| WO | 2021216263 A1 | 10/2021 |

* cited by examiner

PROCESSING MACHINE AND DETERMINING METHOD FOR DETERMINING ABNORMAL PROCESSING OF THE PROCESSING MACHINE

BACKGROUND OF THE DISCLOSURE

Technical Field

The present disclosure relates to a processing machine, especially to a processing machine capable of determining abnormality and a determining method for determining an abnormal processing of the processing machine

Description of the Related-Art

The related-art product line uses processing machines (such as CNC machine or robotic arm) to process a target workpiece. More particularly, the processing machine uses the internal motor to drive, through the rotation of the motor, the tool at tool-end (such as cutting knife or gripper) to conduct processing. By calculating the feedback signal sent from the motor encoder, the processing machine may determine the position of the tool tip.

One of problems present in related-art processing machine is that the motor encoder cannot sense the vibration of tool tip. Therefore, the above-mentioned feedback signal (generally representing motor angle) cannot be directly used as the exact position of the tool tip. More particularly, the processing machine may have vibration due to the motion pro se, or due to the external force exerting on the chassis thereof. The processing machine may not sense the abnormal processing for the workpiece due to vibration in real time during the processing procedure thereof.

In related-art processing machines, the vibration thereof will impact the processing quality for workpiece. However, the vibration cannot be sensed by the processing machines in real time and the defected product can only be found post-processing by quality control personnel. In a word, the related-art processing machine is not efficiency and requires much improvement for processing quality.

SUMMARY OF THE DISCLOSURE

It is an object of the present disclosure to provide a processing machine and a method for determining an abnormal processing of the processing machine. A vibration can be detected in real time and a relative movement value between the tool tip and the workpiece-end can be calculated in real time, thus determine whether the processing machine has abnormal processing by monitoring the relative movement value.

Accordingly, the present disclosure provides a method for determining abnormal processing of processing machine, the method being applied to a processing machine, the processing machine comprising a tool-end and a workpiece-end corresponding to the tool-end, the tool-end being arranged with a tool and the workpiece-end being arranged with a workpiece, the tool comprising a tool tip for processing the workpiece, the method comprising:

a) obtaining an acceleration signal from an accelerometer, the accelerometer being arranged on the tool-end and using an accelerometer coordinate system, the acceleration signal being corresponding to a real acceleration value of the tool tip;

b) double integrating the acceleration signal to generate a movement information;

c) performing an accelerometer coordinate alignment processing to transform the movement information from the accelerometer coordinate system to a transformed movement information in a workpiece-end coordinate system used by the workpiece-end;

d) obtaining a motor position information, wherein the motor position information is related to at least one motor for controlling the tool-end and corresponding to a coordinate value of the tool tip in a tool-end coordinate system;

e) performing a forward kinematics processing to the motor position information to obtain a position vector of the tool tip corresponding to the workpiece-end coordinate system;

f) combining the transformed movement information and the position vector to obtain a relative movement value between the tool tip and the workpiece-end; and g) determining whether the processing machine has abnormal processing based on the relative movement value.

Accordingly, the present disclosure provides a processing machine, comprising:

a workpiece-end for arranging a workpiece and using a workpiece-end coordinate system;

a tool-end for arranging a tool, the tool-end comprising a tool tip for processing the workpiece and using a tool-end coordinate system;

at least one motor connected to the tool-end and controlled to drive the tool for movement and generating a motor position information, wherein the motor position information is corresponding to a coordinate value of the tool tip in the tool-end coordinate system;

an accelerometer arranged on the tool-end and using an accelerometer coordinate system, the accelerometer configured to detect a real acceleration value of the tool tip and generate an acceleration signal;

a driver connected to the at least one motor and the accelerometer, and configured to control the at least one motor, the driver receiving the motor position information and the acceleration signal; and a controller connected to the driver, the controller being configured to perform a double integration procedure to the acceleration signal to generate a movement information, configured to perform an accelerometer coordinate alignment processing to transform the movement information from the accelerometer coordinate system to a transformed movement information in the workpiece-end coordinate system, and configured to perform a forward kinematics processing to the motor position information to obtain a position vector of the tool tip corresponding to the workpiece-end coordinate system;

wherein the controller is configured to combine the transformed movement information and the position vector to obtain a relative movement value between the tool tip and the workpiece-end; and to determine whether the processing machine has abnormal processing based on the relative movement value.

In comparison with related art, the present disclosure can effectively detect the vibration information of the processing machine and precisely calculate a relative movement value between the tool tip and the workpiece-end. By continually calculating the relative movement value between the tool tip and the workpiece-end, the present disclosure can perform online real-time monitoring of processing condition and off-line investigation for processing quality.

BRIEF DESCRIPTION OF DRAWINGS

The features of the disclosure believed to be novel are set forth with particularity in the appended claims. The disclosure itself, however, may be best understood by reference to the following detailed description of the disclosure, which describes an exemplary embodiment of the disclosure, taken in conjunction with the accompanying drawings, in which:

DETAILED DESCRIPTION OF THE EMBODIMENTS

Hereinafter, the embodiments of the present disclosure will be described with reference to the associated drawings. It should be noted various exemplary embodiments shown in the figures are merely illustrative representations and are not necessarily the limit of the claim scope.

The present disclosure discloses a processing machine capable of determining abnormal processing (hereinafter, briefed as processing machine). The processing machine may detect the unexpected movement due to vibration during the processing procedure thereof, thus more precisely calculate the relative movement between the tool-end and the workpiece-end. By monitoring the relative movement, the processing machine may effectively determine whether abnormal processing occurs due to the unexpected vibration during the processing thereof. The above-mentioned unexpected vibration is due to, for example but not limited to, external force, insufficient rigidity of processing machine or abnormal assembling of processing machine.

Figure 1:
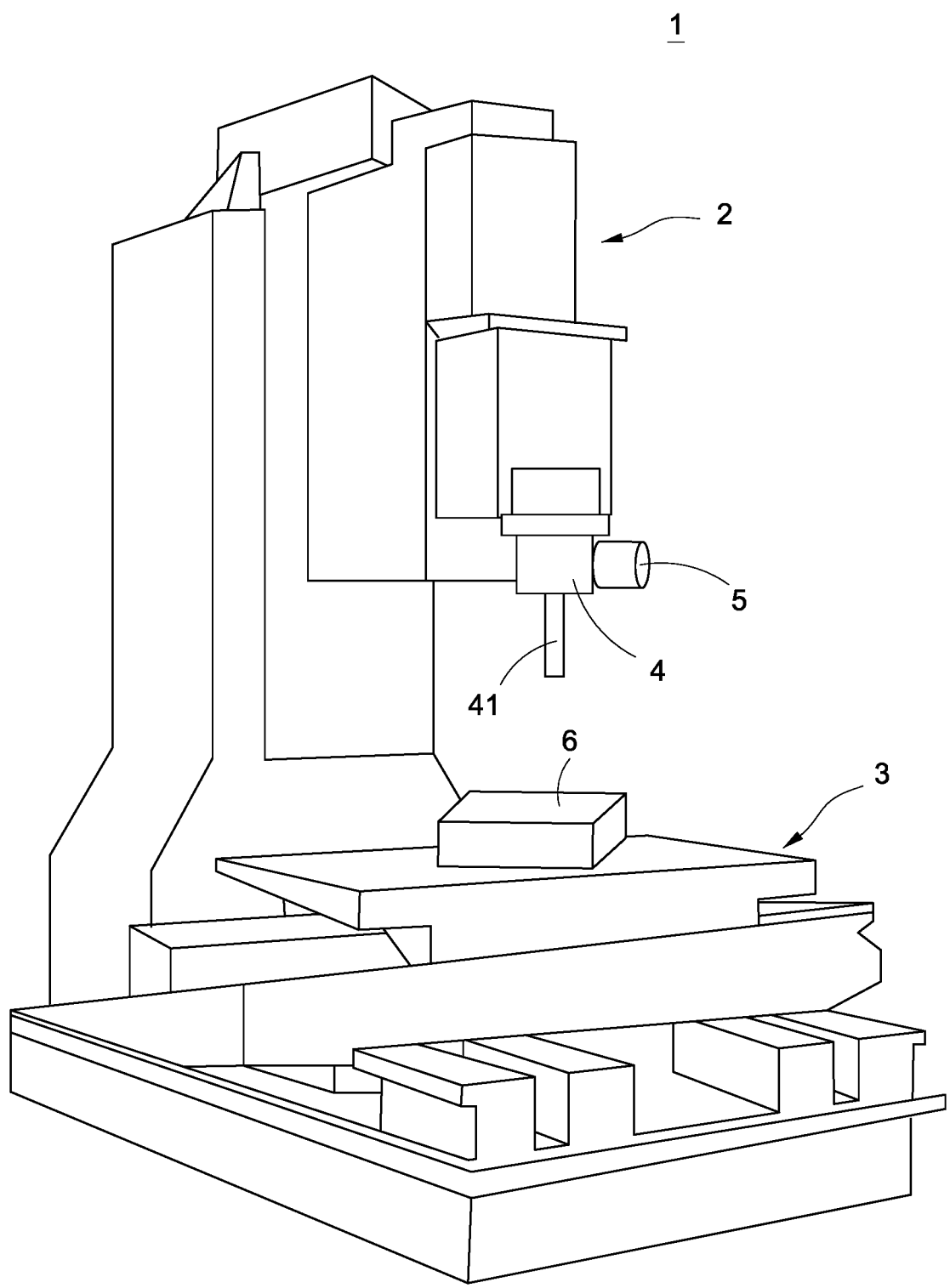
FIG. 1 shows a schematic view of the processing machine according to the first embodiment of the present disclosure.

Please refer to FIG. 1, which shows a schematic view of the processing machine according to the first embodiment of the present disclosure. The processing machine of the present disclosure is, for example but not limited to, various computer numerical control (CNC) processing machines (such as three-axis, four-axis, or five-axis CNC processing machine), machine arm or robot. The embodiment shown in FIG. 1 is exemplified with three-axis CNC processing machine 1, the detail thereof will be described with this disclosure.

As shown in FIG. 1, the processing machine 1 mainly includes a tool-end 2 and a corresponding workpiece-end 3. The tool-end 2 is arranged with a tool 4, and the workpiece-end 3 is used to mount the workpiece 6 to be processed. The tool 4 includes a tool tip 41 at one side thereof and used to process the workpiece 6. The tool 4 is replaceable depending on the workpiece to be processed. For example, the tool 4 may be a handle for a knife to cut aluminum piece if the workpiece 6 is aluminum piece. The tool 4 may be a gripper if the workpiece 6 is electronic component. However, the scope of the present disclosure is not limited by above example. In this disclosure, the tool-end 2 and the tool 4 are positioned with the tool-end coordinate system, while the workpiece-end 3 is positioned with the workpiece-end coordinate system. The workpiece-end coordinate system is different with the tool-end coordinate system and the detail thereof will be given later.

One of the technique features of the present disclosure is that the processing machine 1 includes at least one accelerometer 5 arranged on a movable object on the processing machine 1 to sense the movement (translation) of the movable object. When the processing machine 1 has vibration during the processing procedure, the accelerometer 5 may sense the unexpected movement of the movable object caused by the vibration of the processing machine 1 instantly.

In the embodiment shown in FIG. 1, the processing machine 1 moves the tool-end 2 to drive the tool 4, and then processes the workpiece 6 on the platform of the workpiece-end 3 by the tool tip 41. In this embodiment, the accelerometer 5 is arranged on the tool-end 2. The accelerometer 5 is provided to detect the expected movement of the tool tip 41 and the unexpected movement of the tool tip 41 caused by the vibration, and the accelerometer 5 outputs an acceleration signal to represent the movement of the tool tip 41. Therefore, the arrangement positon of the accelerometer 5 on the tool-end 2 is preferably close to the tool tip 41.

In this embodiment, the accelerometer 5 employs the accelerometer coordinate system for positioning. The accelerometer 5 continually detects the real acceleration of the tool tip 41 during the processing procedure of the processing machine 1 and generates corresponding acceleration signal.

As mentioned above, the accelerometer 5 may detect the expected movement and the unexpected movement of the movable object (such as tool-end 2) on the processing machine 1. The processing machine 1 of this disclosure calculates the relative position between the tool tip 41 and the workpiece-end 3 based on the acceleration signal output by the accelerometer 5. The unexpected movement caused by the vibration can also be taken into account to obtain more precise calculation result and enhance processing yield. Therefore, any moveable object on the processing machine 1 may be provided with an accelerometer 5 to sense the vibration information thereof.

Moreover, if the tool-end 2 is provided with a plurality of tools 4 thereon (or the tool 4 has multiple tool tips 41), each of the tools 4/tool tips 41 may be provided with one accelerometer 5. By the provision of multiple accelerometers 5, the unexpected movement of each of the tools 4/tool tips 41 due to vibration may be sensed respectively, thus obtaining more precise calculation result.

On the other hand, for objects which are non-movable on the processing machine 1 but nevertheless influenced by vibration (for example, those objects may be placed on the platform arranged on a table with possible collision, or vulnerable to vibration of the workpiece-end 3), the accelerometer 5 can be provided thereto to sense the unexpected movement of the object caused by external vibration.

For clarity of illustration, the example shown in FIG. 1 is exemplified with one accelerometer 5 arranged on the tool-end 2. However, the number of the accelerometer 5 is not limited to one, and the arrangement position of the accelerometers 5 is not limited to the tool-end 2.

Figure 2:
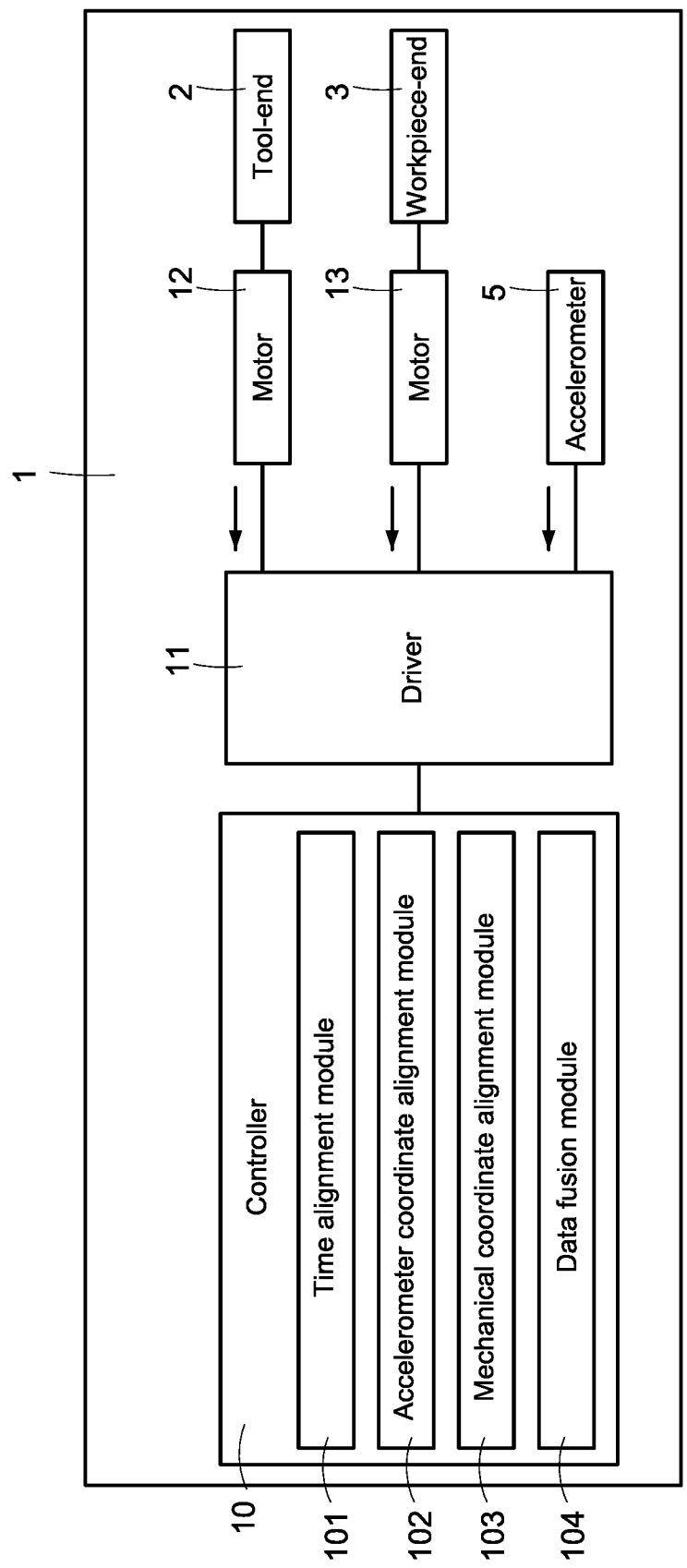
FIG. 2 shows the block diagram of processing machine 1 according to the first embodiment of the present disclosure.

Please refer both to FIG. 1 and FIG. 2. FIG. 2 shows the block diagram of processing machine 1 according to the first embodiment of the present disclosure. As shown in FIG. 2, the processing machine 1 further includes a controller 10, a driver 11 and a motor 12. The controller 10 is operatively connected to the driver 11 and sends motor command to the driver 11. The driver 11 is operatively connected to the motor 12 and controls the motor 12 based on the motor command. The motor 12 is connected to the tool-end 2 and rotates, based on the motor command, to drive the tool-end 2 and move the tool 4 on the tool-end 2 accordingly, thus realize processing procedure with the tool tip 41.

More specifically, the processing machine 1 of this embodiment is provided with at least one motor 12, the action exerted by the motor 12 under the control of the motor command may move the tool 4. Notably, the number of the motor 12 is not limited to one. In other embodiment, the processing machine 1 may include a plurality of motors 12 connected between the driver 11 and the tool-end 2, thus achieve the synchronous movement of the tool-end 2 and tool 4 with the plurality of motors 12.

If the processing machine 1 is equipped with movable workpiece-end 3, the processing machine 1 may further include one or more motor 13 connected between the driver 11 and the workpiece-end 3. In this embodiment, the controller 10 sends motor command to the driver 11, and the controls the motor 13 based on the motor command. The motor 13 rotates, based on the motor command, to drive the workpiece-end 3. Therefore, the processing machine 1 performs the processing procedure by the tool tip 41 together with the workpiece-end 3.

In the embodiment shown in FIG. 2, the driver 11 is connected to the motor 12 and the accelerometer 5 to control the motor 12 and receive the motor position information related to the position of the motor 12 and the acceleration signal output by the accelerometer 5. Notably, the motor 12 rotates based on the motor command and the motor position information related to the motor is generated (for example, the motor position information is generated by the motor encoder arranged on the motor 12). The processing machine 1 moves the tool tip 41 to desired position by the rotation of the motor 12. Therefore, the motor position information may be corresponding to the coordinate value of the tool tip 41 in the tool-end coordinate system. In situation of not taking into account the unexpected vibration, the motor position information may be directly used as the coordinate value of the tool tip 41 in the tool-end coordinate system.

According to one technical features of the present disclosure, the controller 10 calculates a relative movement value between the tool tip 41 and the workpiece end 3 based on the motor position information and the acceleration signal, where the relative movement value includes an expected movement of the tool-tip 41 due to the rotation of the motor 12 and an unexpected movement of the tool tip 41 subject to the vibration.

Figure 3B:
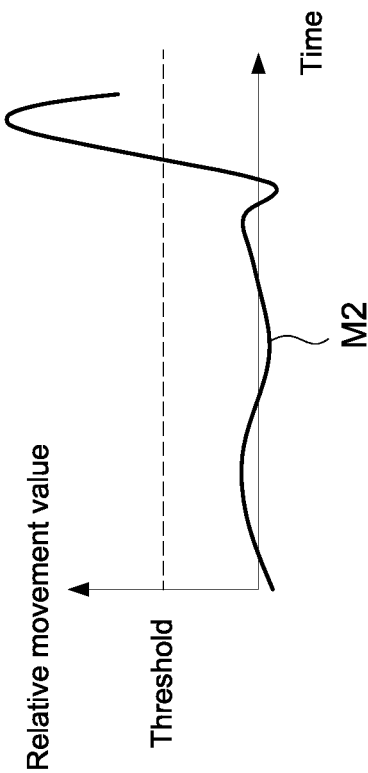
FIG. 3B shows the relative movement in the second embodiment.
Figure 3A:
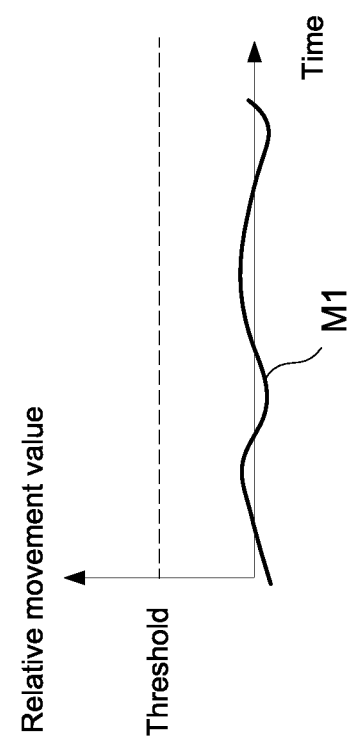
FIG. 3A shows the relative movement in the first embodiment.

Please refer both to FIG. 3A and FIG. 3B, which respectively show the relative movement in the first embodiment and the second embodiment.

As described above, during the processing procedure of the processing machine 1, the controller 10 continually calculates the relative movement value between the tool tip 41 and the workpiece end 3 based on the motor position information and the acceleration signal. The relative movement value not only includes the expected movement of the tool-tip 41 due to the processing need, but also includes the unexpected movement of the tool tip 41 subject to the vibration.

As shown in FIG. 3A, during normal operation of the processing machine 1, the relative movement value M1 between the tool tip 41 and the workpiece end 3 is shown to be normal. As shown in FIG. 3B, if the processing machine 1 has unexpected movement due to internal factor or external factor, the relative movement value M2 between the tool tip 41 and the workpiece end 3 is shown to have instantaneous peak (extreme value). For example, the processing machine 1 may collide with external force, and, accordingly, the relative movement value M2 exceeds threshold value.

When the elative movement M2 exceeds threshold value, the workpiece 6 under processing may become defective product. Therefore, the processing machine 1 needs to instantly halt (stop). In one embodiment, the controller 10 may directly halt the processing machine 1 when the controller 10 determines that the relative movement value M2 exceeds the threshold value. In another embodiment, the controller 10 may generate control signal and send the control signal to the motor (or to the motor driver) to halt the motor for the processing machine 1 when the controller 10 determines that the relative movement value M2 exceeds the threshold value. The processing machine 1 can be prevented from further processing the product with potential defect, thus save processing time. Besides, it also achieves online real-time monitoring of processing condition according to the present disclosure.

Moreover, the workpieces 6 in production line may have their individual serial numbers. The controller 10 may record the serial number and processing time for each workpiece 6, and record the above mentioned relative movement values M1, M2 during processing. When quality control personnel finds defective product upon examining the finished product, the relative movement values M1, M2 corresponding to the defective product may be checked according to the serial number and processing time for the defective product, thus ensure the factors causing the defective products. The present disclosure provides post-process examination for processing status and may achieve off-line investigation for processing quality.

Please refer back to FIG. 2. In one embodiment, the controller 10 may be central processing unit (CPU), micro control unit (MCU), graphics processing unit (GPU) or field programmable gate array (FPGA). In another embodiment, the controller 10 may be, for example but not limited to, personal computer, industrial PC (IPC), rack server, cloud server or laptop computer independent to the processing machine 1, and may be connected to the driver 11 of the processing machine 1 through network or communication port. The scope of the disclosure is not limited to above examples.

In one embodiment, the controller 10 may conduct temporal and spacial processing to the motor position information and the acceleration signal, and mix the resulting signals to generate the relative movement values M1, M2 shown in FIG. 3A and FIG. 3B.

More specifically, the controller 10 is recorded with computer executable program code. Upon executing the computer executable program code, the controller 10 may achieve the major functions thereof such as performing temporal processing to the motor position information and the acceleration signal, performing spacial processing to the motor position information and the acceleration signal, and performing data fusion to the processed signals and so on.

To realize above functions for the controller 10, the above-mentioned computer executable program code may include a plurality of software-implemented virtual modules (such as subroutines in the computer executable program code). Each of the virtual modules executes a specific function of the controller 10. In the embodiment shown in FIG. 2, the controller 10 logically separates the computer executable program code into a plurality of virtual modules, which include time alignment module 101, accelerometer coordinate alignment module 102, mechanical coordinate alignment module 103 and data fusion module 104. However, above description is used to demonstrate one of the embodiments in the disclosure and the controller 10 is not limited to above modules 101-104.

Figure 4:
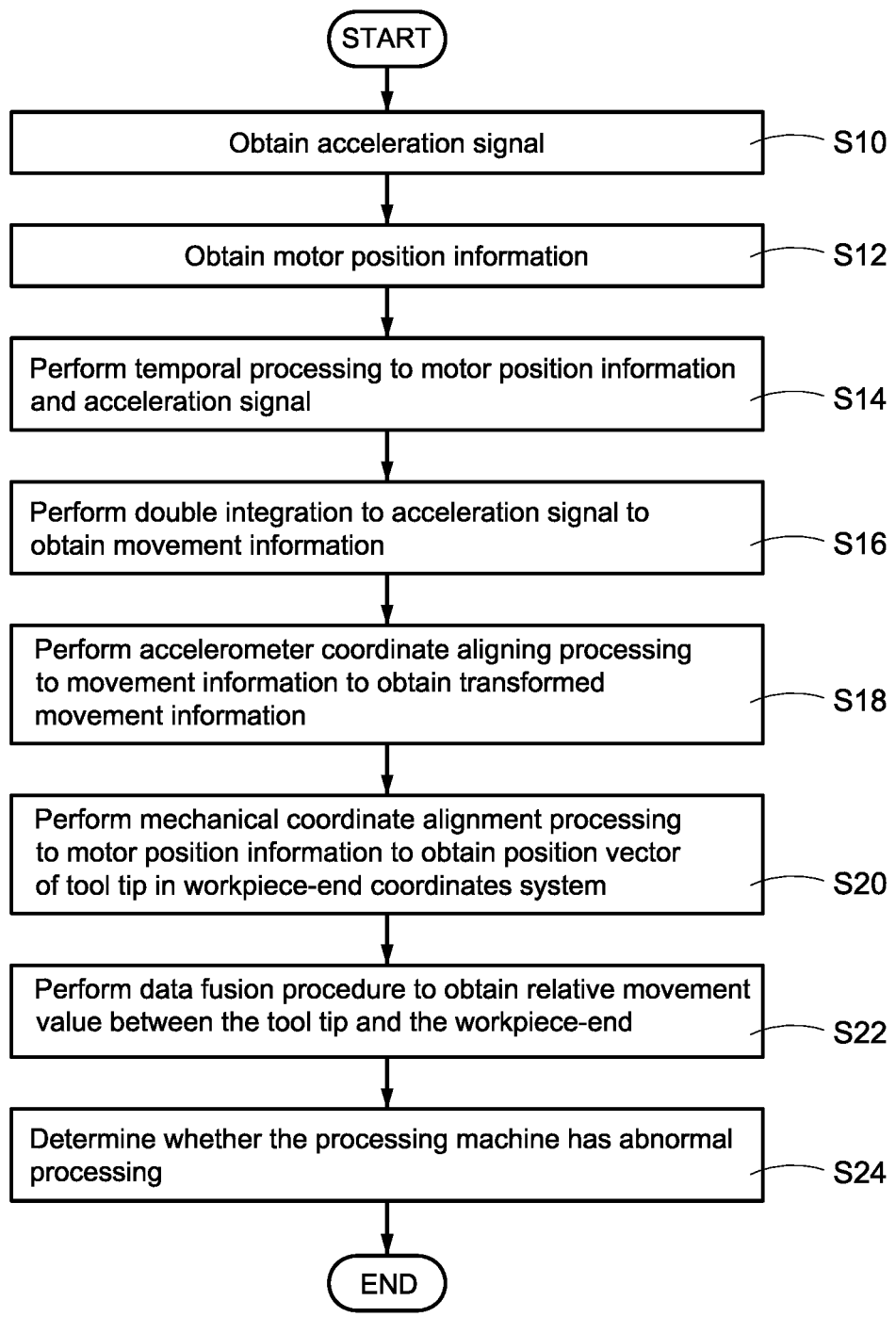
FIG. 4 shows the flowchart of the determining method according to the first embodiment of the present disclosure.

Please refer to FIG. 1 to FIG. 4, where FIG. 4 shows the flowchart of the determining method according to the first embodiment of the present disclosure. According to one of the objects of the present disclosure, the relative movement value between the tool tip 41 and the workpiece-end 3 is continually (or continuously) calculated during the processing procedure of the processing machine 1, thus determines whether abnormality occurs due to unexpected vibration in the processing procedure. Accordingly, during the processing procedure of the processing machine 1, the controller 10 first continually obtains the acceleration signal from the accelerometer 5 (step S10) and obtains the motor-position information (step S12), where the steps S10 and S12 do not need to perform in specific order.

In this embodiment, the accelerometer 5 is directly arranged at the tool-end 2 such that the acceleration signal output by the accelerometer 5 is corresponding to the real acceleration value of the tool-tip 41. The motor position information is generated based on the motor angle of the motor 12 controlling the tool-end 2 and accordingly can be corresponding to the coordinate value of the tool tip 41 in the tool-end coordinate system.

In one embodiment, the motor is a sensor based motor. The driver 11 controls the rotation of the motor 12 based on the motor command sent from the controller 10. The motor 12 further feeds back signal with the motor encoder (not shown in FIG. 1 to FIG. 4) to send the motor position information to the driver 11. In the embodiment, the motor position information is the encoder signal and can exactly corresponding to the real motor angle.

In another embodiment, besides controlling the rotation of motor 12 by motor command, the driver 11 also sends the motor command to a virtual motor model (not shown) constituted by mathematical model. In this embodiment, the virtual motor model can be used to simulate the function of the motor encoder. The virtual motor model calculates the real motor angle based on motor command and generates the corresponding feedback signal to be used as motor position information.

However, the above description is only for part of embodiments in the present disclosure and is not the limitation to the present disclosure.

After the steps S10 and S12, the controller 10 performs temporal processing to the motor position information and the acceleration signal by the time alignment module 101 (step S14) such that the motor position information and the acceleration signal are synchronous in time and together they can be used to describe the relative position relationship between the tool-tip 41 and the workpiece-end 3 at a specific time point.

In another embodiment, the time alignment module 101 can be realized by external time alignment skill such as EtherCAT synchronous signal to achieve time synchronization. In this embodiment, the controller 10 may dispense with the time alignment module 101. Namely, the motor position information and the acceleration signal received by the controller 10 are already synchronized and need no temporal processing mentioned above.

Afterward, the controller 10 uses the accelerometer coordinate alignment module 102 to perform double integration to the acceleration signal to obtain the movement information (step S16). More particularly, the controller 10 first performs the first integration to the acceleration signal to convert the acceleration signal to the speed signal and then performs the second integration to the speed signal to obtain the movement information.

As mentioned above, the accelerometer 5 uses the accelerometer coordinate system as the default coordinate system, therefore, the movement information is described (defined) by the accelerometer coordinate system. After step S16, the accelerometer coordinate alignment module 102 performs accelerometer coordinate aligning processing to the movement information to transform the movement information in accelerometer coordinate system to transformed movement information in workpiece-end coordinates system used by the workpiece-end 3, thus generate the transformed movement information (step S18).

More particularly, the above movement information defines (describes) the location of the tool tip 41 in accelerometer coordinate system; while the transformed movement information describes the location of the tool tip 41 in workpiece-end coordinates system. The present disclosure uses alignment processing to transform different information to the same coordinate system, thus facilitate the mixing of that information to precisely describe the location of the tool tip 41. In the embodiment shown in FIG. 4, all of the information is transformed to the workpiece-end coordinates system, however, this embodiment is not limitation to the present disclosure.

On the other hand, the controller 10 uses the mechanical coordinate alignment module 103 to perform mechanical coordinate alignment processing to the motor location information, thus obtain the position vector of the tool tip 41 in workpiece-end coordinates system (step S20). In one embodiment, the above mentioned mechanical coordinate alignment processing may be embodied with forward kinematics. In this embodiment, the mechanical coordinate alignment module 103 performs, based on the workpiece-end coordinates system, the forward kinematics to the motor position information to transform the coordinate information of the motor 12 in the axial space (namely, the motor position information) into a vector in the workpiece-end coordinates system. Besides, the vector may describe the location of the tool tip 41 controlled by the motor 12 in the workpiece-end coordinates system.

The movement information can be obtained by double integrating the acceleration signal, and can represent the position of the tool tip 41. Therefore, the controller 10 may perform coordinate transformation to the movement information to achieve alignment processing. The motor position information represents the rotation angle of the motor 12. The rotation angle needs to first convert to position in 3D space by the forward kinematics and then coordinate transform is performed thereto.

More particularly, there is no execution order requirement for steps S18 and S20. In one embodiment, the controller 10 may first execute step S18 to obtain the transformed movement information and then execute step S20 to obtain position vector. In another embodiment, the controller 10 may first execute step S20 to obtain position vector and then execute step S18 to obtain the transformed movement information. In still another embodiment, the controller 10 may simultaneously execute step S18 and S20 by multiprocessing. Therefore, the execution order is not limited to that shown in FIG. 4.

After step S18 and S20, the controller 10 further performs data fusion procedure by the data fusion module 104 to obtain the relative movement value between the tool tip 41 and the workpiece-end 3 (step S22). More particularly, the data fusion module 104 mixes the transformed movement information and the position vector to generate the relative movement value between the tool tip 41 and the workpiece-end 3.

Based on the generated relative movement value, the controller 10 may determine whether the processing machine 1 has abnormal processing (step S24). Notably, the controller 10 continually performs the step S10 to step S24 during the processing procedure of the processing machine 1 to continually monitor and calculate the relative movement value between the tool tip 41 and the workpiece-end 3 (namely, generating the curves shown in FIG. 3A and FIG. 3B), thus determine whether the processing machine 1 has abnormal processing due to unexpected vibration.

In one embodiment, the accelerometer coordinate alignment module 102 mainly performs proper Euler angles transformation to the movement information based on the workpiece-end coordinates system, thus process the movement information and generate the transformed movement information. The transformed movement information is described based on the workpiece-end coordinates system, therefore, the transformed movement information is aligned with the information of the workpiece-end 3 (namely, the information in accelerometer coordinate system and the information in workpiece-end coordinates system can be correctly described in workpiece-end coordinates system after alignment processing).

The above mentioned proper Euler angles transform procedure may multiply the movement information by the ZYX Euler angle transformation matrix. Namely, the procedure first rotates the movement information with respect to the Z axis of the accelerometer coordinate system by C degrees, then rotates the rotated movement information with respect to the Y axis of the accelerometer coordinate system by B degrees, and then rotates the rotated movement information with respect to the X axis of the accelerometer coordinate system by A degrees. The above mentioned angles are set according to the known difference between the accelerometer coordinate system and the workpiece-end coordinates system. The ZYX proper Euler angles transformation matrix can be expressed as follows.

$$R = \begin{bmatrix} \cos C \cos B & \cos C \sin B \sin A - \sin C \cos A & \cos C \sin B \cos A + \sin C \sin A \\ \sin C \cos B & \sin C \sin B \sin A + \cos C \cos A & \sin C \sin B \cos A - \cos C \sin A \\ -\sin B & \cos B \sin A & \cos B \cos A \end{bmatrix} \circ$$

where R is the Euler angles transformation matrix.

In one embodiment, the accelerometer coordinate alignment module 102 may calculate the transformed movement information by following formula.

$$U = RV \circ$$

In above formula, R is the Euler angles transformation matrix, V is the movement information such as coordinate values $(X_V, Y_V, Z_V)$ or movement amount respectively along three axes, and U is the transformed movement information such as coordinate values $(X_U, Y_U, Z_U)$ or movement amount respectively along three axes. For example, if the movement information is movement amount respectively along three axes and the Euler angles transformation matrix is 30 degrees for Z axis, 40 degrees for Y axis and 50 degrees for Z axis, then the movement amounts in the first coordinate system (for example, 1 μm, 2 μm, 3 μm) can be transformed to the movement amounts in the second coordinate system (for example, 3.096 μm, 0.618 μm, 2.008 μm).

In one embodiment, the mechanical coordinate alignment module 103 executes the forward kinematics in step S20, where the forward kinematics calculates the motor position information by using Denavit-Hartenberg Parameters (DH Parameters) in workpiece-end coordinates system and generates the position vector of the tool tip 41 in the workpiece-end coordinate system. The DH Parameters includes following three formulas.

$$T_i^{i-1} = \begin{bmatrix} \cos\theta_i & -\cos\alpha_i\sin\theta_i & \sin\alpha_i\sin\theta_i & b_i\cos\theta_i \\ \sin\theta_i & \cos\alpha_i\cos\theta_i & -\sin\alpha_i\cos\theta_i & b_i\sin\theta_i \\ 0 & \sin\alpha_i & \cos\alpha_i & d_i \\ 0 & 0 & 0 & 1 \end{bmatrix} \circ$$

$$T_E^B = T_1^0 T_2^1 \dots T_n^{n-1} = \begin{bmatrix} R_E^B & t_E^B \\ 0_{1\times 3} & 1 \end{bmatrix} \circ$$

$$^0 r_i = T_E^{Bi} r_i \circ$$

In above formulas, $T_i^{i-1}$ is the transformation matrix from $(i-1)_{th}$ axis to $i_{th}$ axis, B is the base coordinate system at source end (such as tool-end coordinates system), E is the coordinate system at destination end (such as workpiece-end coordinates system), R is the rotation matrix, t is the translation matrix, and $^0 r_i$ is the vector from the base coordinate system to the destination end of the $i_{th}$ axis.

More particularly, forward kinematics and DH Parameters are known for people skilled in the coordinate transformation, and the detailed descriptions thereof are omitted here for brevity.

Figure 5:
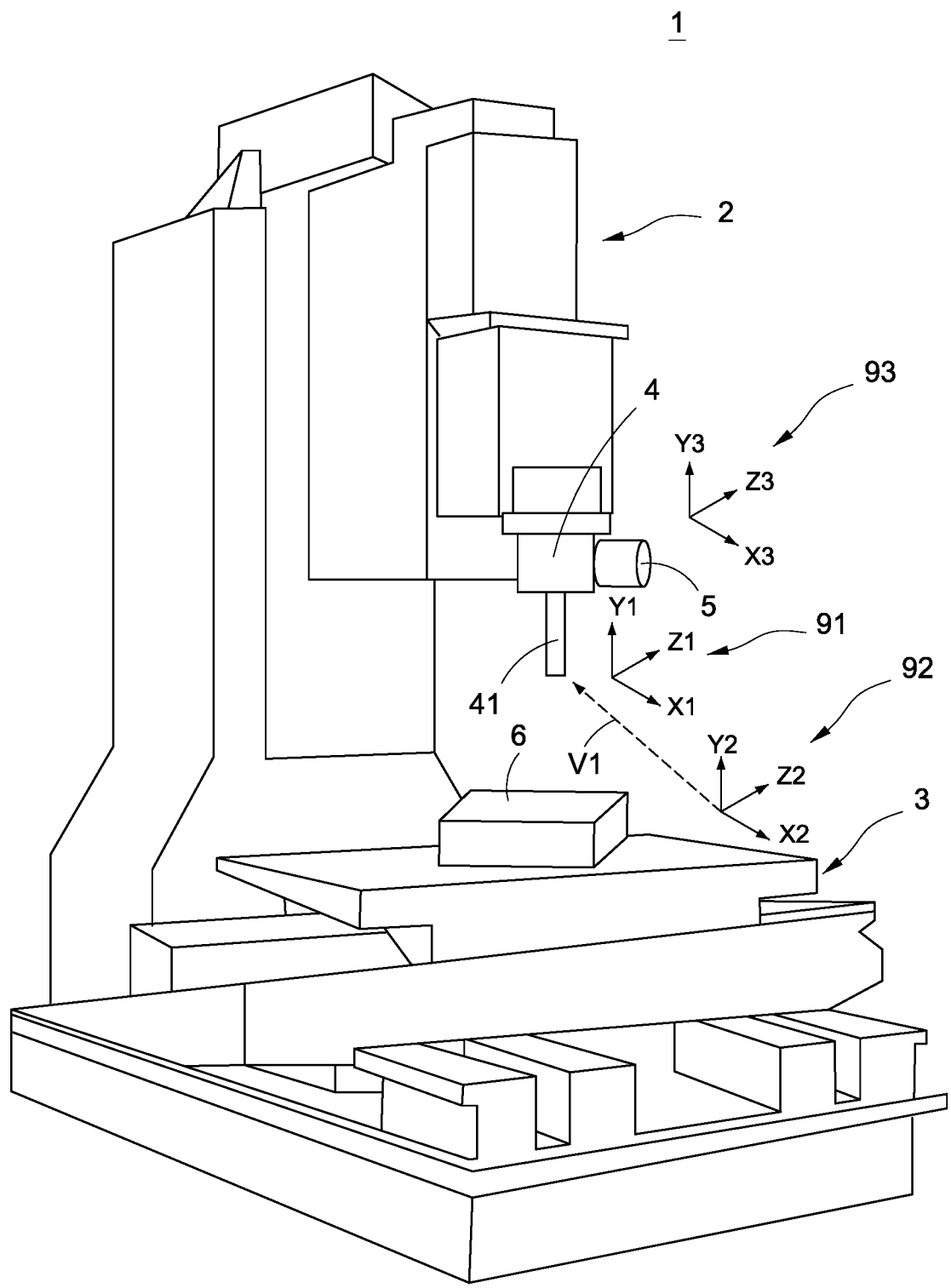
FIG. 5 shows the coordinate alignment according to the first embodiment in the disclosure.

Please refer to FIGS. 1, 2, 4, and 5, where FIG. 5 shows the coordinate alignment according to the first embodiment in the disclosure. In the embodiment shown in FIG. 5, both the tool-end 2 and the tool 4 thereon use tool-end coordinates system 91, the workpiece-end 3 uses the workpiece-end coordinates system 92, and the accelerometer 5 uses the accelerometer coordinate system 93.

In this embodiment, the controller 10 uses the workpiece-end coordinates system 92 as base coordinates system for all position-related information. More particularly, the controller 10 transforms the motor position information for describing the coordinate value of the tool tip 41 in the tool-end coordinates system 91 into a first vector for describing a relative position of the tool tip 41 in the workpiece-end coordinates system 92. The controller 10 further transforms the movement information for describing the movement status of the tool tip 41 in the accelerometer coordinate system 93 into the transformed movement information for describing the movement status of the tool tip 41 in workpiece-end coordinates system 92. The first vector V1 is the coordinate value of the tool tip 41 corresponding to the origin (0,0,0) of the workpiece-end coordinates system 92.

When all of the position-related information is described by the same base coordinates system (such as the workpiece-end coordinates system 92 in this embodiment), the controller 10 may perform calculation (such as the data fusion procedure in step S22 of FIG. 4) to generate the relative movement value between the tool tip 41 and the workpiece-end 3.

Notably, as shown in FIG. 1, if the workpiece-end 3 of the processing machine 1 is movable, the processing machine 1 may further include a motor 13 connected to the driver 11 and the workpiece-end 3.

When the workpiece-end 3 is movable, the workpiece 6 also moves with the workpiece-end 3. In this embodiment, the controller 10 needs to calculate the first vector V1 for describing the position of the tool tip 41 based on the workpiece-end coordinates system 92, calculate transformed movement information for describing the movement status of the tool tip 41 based on the workpiece-end coordinates system 92, and calculate another vector for describing the position of the workpiece 6 based on the workpiece-end coordinates system 92. The controller 10 then calculates the relative movement value between the tool tip 41 and the workpiece-end 3 based on the first vector V1, the transformed movement information and the another vector.

However, the workpiece 6 is placed on the workpiece-end 3, and accordingly the position information of the workpiece 6 is described by the workpiece-end coordinates system 92 per se. In other word, the another vector for describing the position of the workpiece 6 based on the workpiece-end coordinates system 92 is zero. Namely, the controller 10 may only need to obtain the first vector and the transformed movement information to calculate relative movement value between the tool tip 41 and the workpiece-end 3 in case that the workpiece-end coordinates system 92 is used as base coordinates system, even though the processing machine 1 use movable workpiece-end 3.

Figure 6:
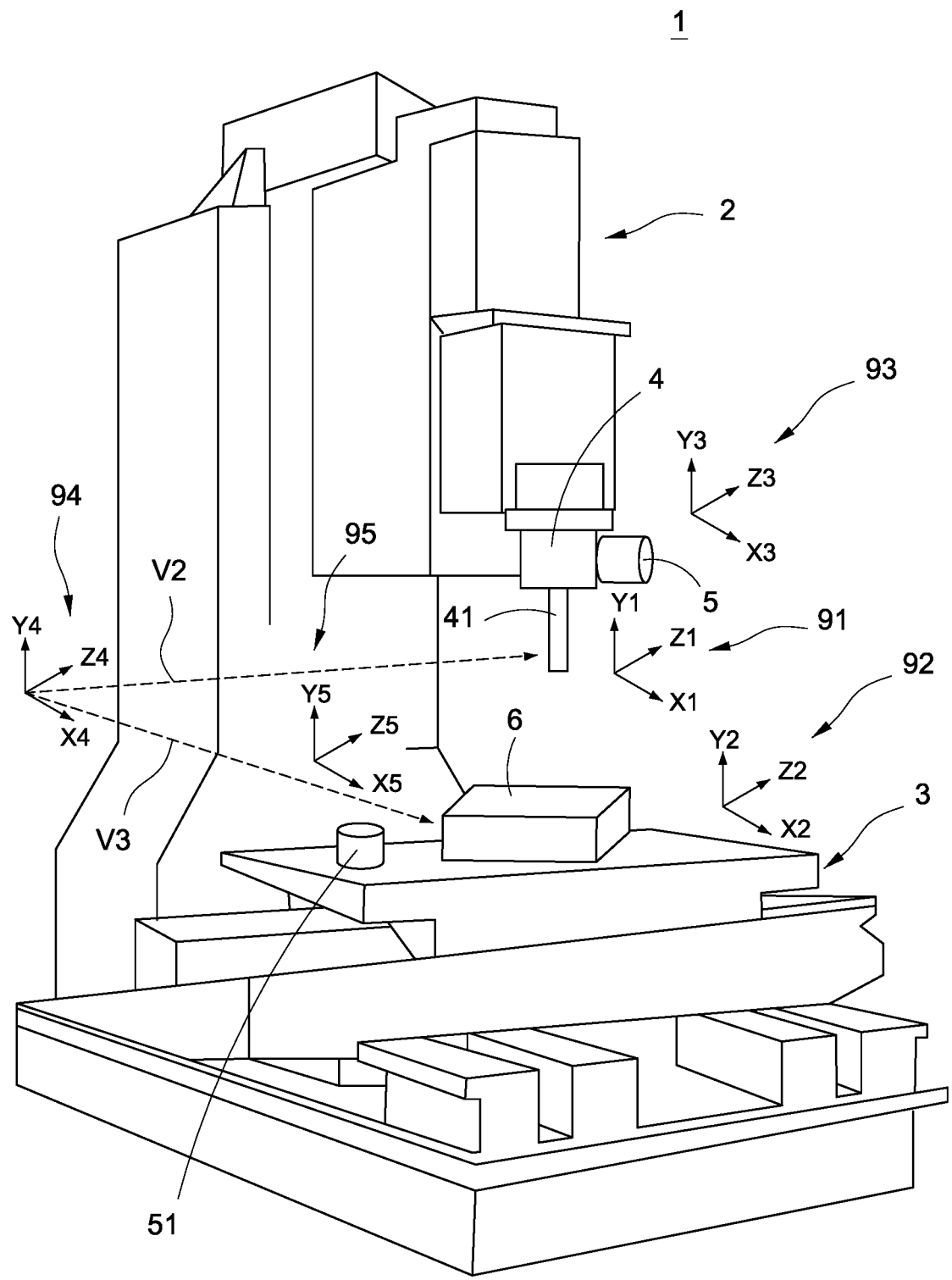
FIG. 6 shows the coordinate alignment according to the second embodiment in the disclosure.

Please refer to FIGS. 1, 2, 4, and 6, where FIG. 6 shows the coordinate alignment according to the second embodiment in the disclosure. In the embodiment shown in FIG. 6, the controller 10 uses the ground coordinates system (world coordinates system) 94 as the base coordinates system for all position-related information. In this embodiment, the controller 10 transforms the motor position information for describing the coordinate value of the tool tip 41 in the tool-end coordinates system 91 into a second vector for describing a relative position of the tool tip 41 in the ground coordinates system 94. The controller 10 further transforms the movement information for describing the movement status of the tool tip 41 in the accelerometer coordinate system 93 into the transformed movement information for describing the movement status of the tool tip 41 in ground coordinates system 94.

In the embodiment shown in FIG. 6, the processing machine 1 does not use the workpiece-end coordinates system 92 as the base coordinates system. Therefore, in step S18 of FIG. 4, the controller 10 processes the movement information generated by the accelerometer 5 and is based on the ground coordinates system 94 to generate the transformed movement information described by the ground coordinates system 94. Moreover, in the step S20 of FIG. 4, the controller 10 performs, based on the ground coordinates system 94, forward kinematics to motor position information to obtain the second vector V2 for describing the relative position of the tool tip 41 in the ground coordinates system 94.

Moreover, the processing machine 1 does not use the workpiece-end coordinates system 92 as base coordinates system. The controller 10 needs to further obtain the motor position information for the motor 13 controlling the workpiece-end 3 and perform forward kinematics in ground coordinates system 94 to the motor position information to obtain a third vector V3 for describing the position of the workpiece-end 3 in ground coordinates system 94 in case that the workpiece-end 3 is movable.

By commonly describing the second vector V2, the third vector V3 and the transformed movement information in the ground coordinates system 94, the controller 10 may precisely calculate the relative movement value between the tool tip 41 and the workpiece-end 3.

In one embodiment, if the workpiece-end 3 of the processing machine 1 is movable, then the processing machine 1 may further include a second accelerometer 51 arranged on the workpiece-end 3. The second accelerometer 51 is based on a second accelerometer coordinate system 95 and obtains a second acceleration value during the processing of the processing machine 1, where the second acceleration information is corresponding to the real acceleration value of the workpiece-end 3.

In this embodiment, the controller 10 also obtains the second acceleration value from the second accelerometer 51 in step S10 of FIG. 4, also performs the double integration to the second acceleration value to generate a second movement information in step S16, and also performs the accelerometer coordinate aligning processing to transform the second movement information in the second accelerometer coordinate system 95 to base coordinate system (namely, the workpiece-end coordinates system 92 or ground coordinates system 94), thus generate a second transformed movement information.

Besides, in this embodiment, the controller 10 also, in step S22 of FIG. 4, calculates relative movement value with reference to the second transformed movement information. Therefore, the relative movement value calculated by the controller 10 also includes the unexpected movement of the workpiece-end 3 caused by vibration besides the unexpected movement of the tool tip 41 caused by vibration. Accordingly, the relative movement value calculated by the controller 10 is more precise.

Figure 7:
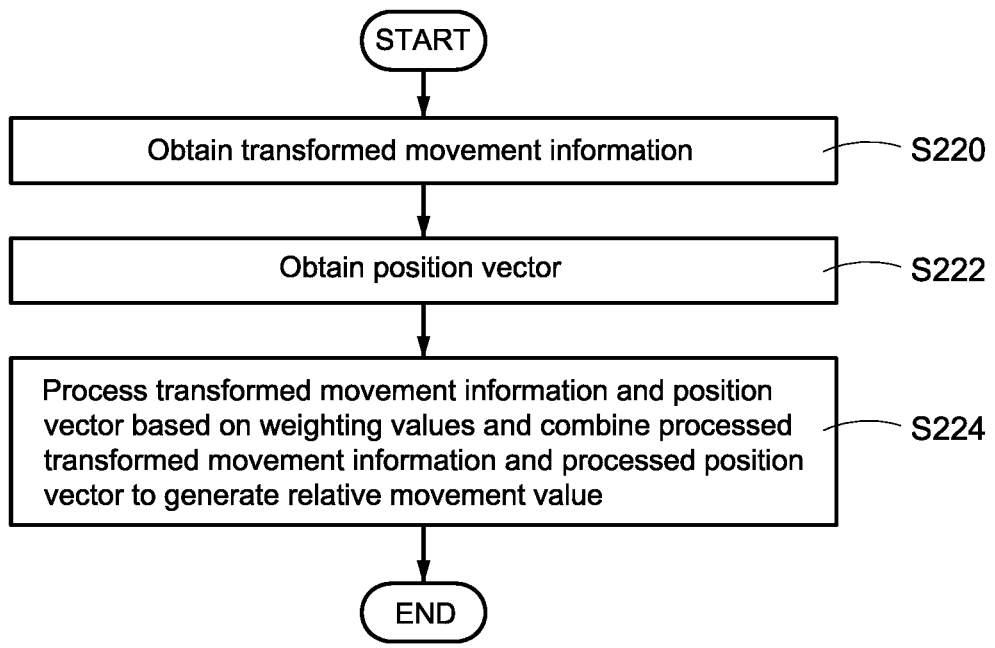
FIG. 7 shows the data fusion flowchart according to the first embodiment of the present disclosure.

Please refer to FIGS. 1, 2, 4, and 7, where FIG. 7 shows the data fusion flowchart according to the first embodiment of the present disclosure. FIG. 7 depicts how to perform data fusion procedure to obtain the relative movement value between the tool tip 41 and the workpiece-end 3 in the S22 of FIG. 4 executed by the controller 10.

As shown in FIG. 7, when executing the data fusion procedure, the controller 10 first obtains the transformed movement information through the data fusion module 104 (step S220), and then obtains the position vector (step S222). Besides, the controller 10 uses the data fusion module 104 to process the transformed movement information based on the first weighting value, process the position vector based on the second weighting value, and combine the processed transformed movement information and the processed position vector to generate the relative movement value (step S224). For the first weighting value, the high-frequency component thereof is larger than the low-frequency component thereof; for the second weighting value, the low-frequency component thereof is larger than the high-frequency component thereof.

More particularly, the present disclosure arranges the accelerometer 5 on the tool-end 2 to directly detect the acceleration signal of the tool tip 41. Therefore, the transformed movement information can directly represent the relative movement value between the tool tip 41 and the workpiece-end 3 if the movement information is calculated based on the acceleration signal, and then the movement information is transformed to the workpiece-end coordinates system.

However, the accelerometer 5 outputs the acceleration signal with voltage signal and offset is frequently present in the voltage signal. Namely, the accelerometer 5 still has output signal (namely, output voltage) even the tool-end 2 dost not move. This causes erroneous determination of the controller 10. Therefore, in the acceleration signal output by the accelerometer 5, the low-frequency component thereof is less reliable.

On the other hand, the high frequency vibration of the tool tip 41 cannot be manifested from the motor position information. Therefore, this embodiment arranges accelerometer at the tool tip 41 for auxiliary.

The data fusion module 104 of the present disclosure reduces the low-frequency component in the transformed movement information (resulted from the accelerometer 5) by the first weighting value, and reduces the high-frequency component in the position vector (resulted from the motor 12) by the second weighting value. By the processing based on the first weighting value and the second weighting value, the calculation of the relative movement value is mainly based on the high-frequency component in the transformed movement information and the low-frequency component in the position vector. Therefore, the problem caused by the low-frequency offset of the accelerometer 5 and the failure of the motor position information to predict the unexpected vibration can be prevented.

Please refer to FIGS. 8, 9 and 10, the embodiment for processing the high-frequency signal and the low-frequency signal will be described.

Figure 8:
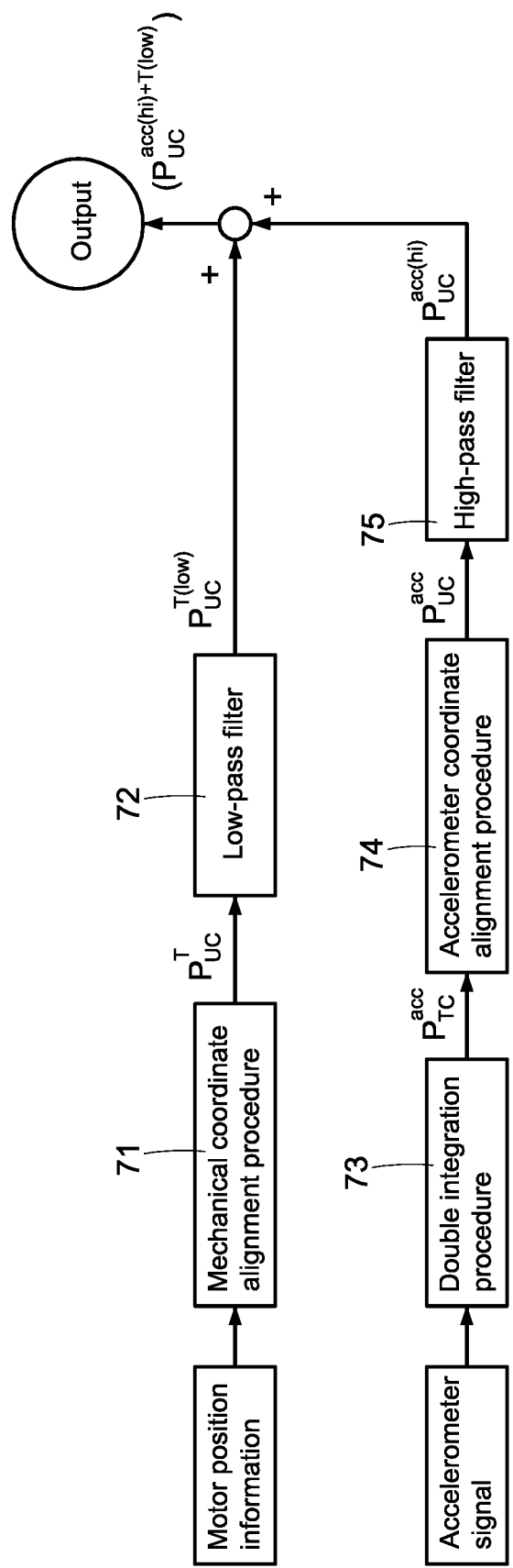
FIG. 8 shows the data fusion flowchart according to the first embodiment of the present disclosure.

Please also refer to FIGS. 1, 2, 4, 7 and 8, where FIG. 8 shows the data fusion flowchart according to the first embodiment of the present disclosure.

In the embodiment shown in FIG. 8, the controller 10 performs the mechanical coordinate alignment procedure 71 for the motor position information to generate the position vector $P_{UC}^{T}$ for describing the coordinate value of the tool tip 41 based on the workpiece-end coordinates system. Then the controller 10 performs filtering to the position vector $P_{UC}^{T}$ by low-pass filter 72 to generate low-frequency position vector $P_{UC}^{T(low)}$.

Besides, the controller 10 performs double integration procedure 73 to the acceleration signal output by the accelerometer 5 to generate the movement information $P_{TC}^{acc}$ for describing the position of the tool tip 41 based on the tool-end coordinates system. Furthermore, the controller 10 performs the accelerometer coordinate alignment procedure 74 to the movement information $P_{TC}^{acc}$ to generate the transformed movement information $P_{UC}^{acc}$ for describing the position of the tool tip 41 based on the workpiece-end coordinates system. The controller 10 then filters the transformed movement information $P_{UC}^{acc}$ by high-pass filter 75 or band-pass filter to generate the high frequency movement information $P_{UC}^{acc(hi)}$.

Finally, the controller 10 adds the low-frequency position vector $P_{UC}^{T(low)}$ with the high frequency movement information $P_{UC}^{acc(hi)}$ to obtain the relative movement value $P_{UC}^{acc(hi)+T(low)}$ between the tool tip 41 and the workpiece-end 3.

In the embodiment shown in FIG. 8, the high frequency component of the relative movement value $P_{UC}^{acc(hi)+T(low)}$ is obtained from the output acceleration signal of the accelerometer 5, and the low frequency component of the relative movement value $P_{UC}^{acc(hi)+T(low)}$ is obtained from the motor position information of the motor 12. Therefore, the problem caused by the low-frequency offset of the accelerometer 5 and the failure of the motor position information to predict the unexpected vibration can be prevented.

Notably, if the processing machine 1 is provided with a plurality of accelerometers (such as the accelerometer 5 and the second accelerometer 51 shown in FIG. 6), the controller 10 also performs double integration procedure 73 and the accelerometer coordinate alignment procedure 74 to the second acceleration signal output by the second accelerometer 51, thus generate the second transformed movement information. The controller 10 further uses the high-pass filter 75 or band-pass filter to filter the second transformed movement information to generate the second high-frequency movement information. In this embodiment, the controller 10 adds the low-frequency position vector, the high-frequency movement information and the second high-frequency movement information together to generate the relative movement value between the tool tip 41 and the workpiece-end 3.

Notably, in other embodiments, the controller 10 may perform subtraction between the transformed movement and the second transformed movement (both of which are processed by the accelerometer coordinate alignment procedure 74) and then the result is filtered by the high-pass filter 75 or band-pass filter. Therefore, the execution order is not limited to that shown in FIG. 8

Figure 9:
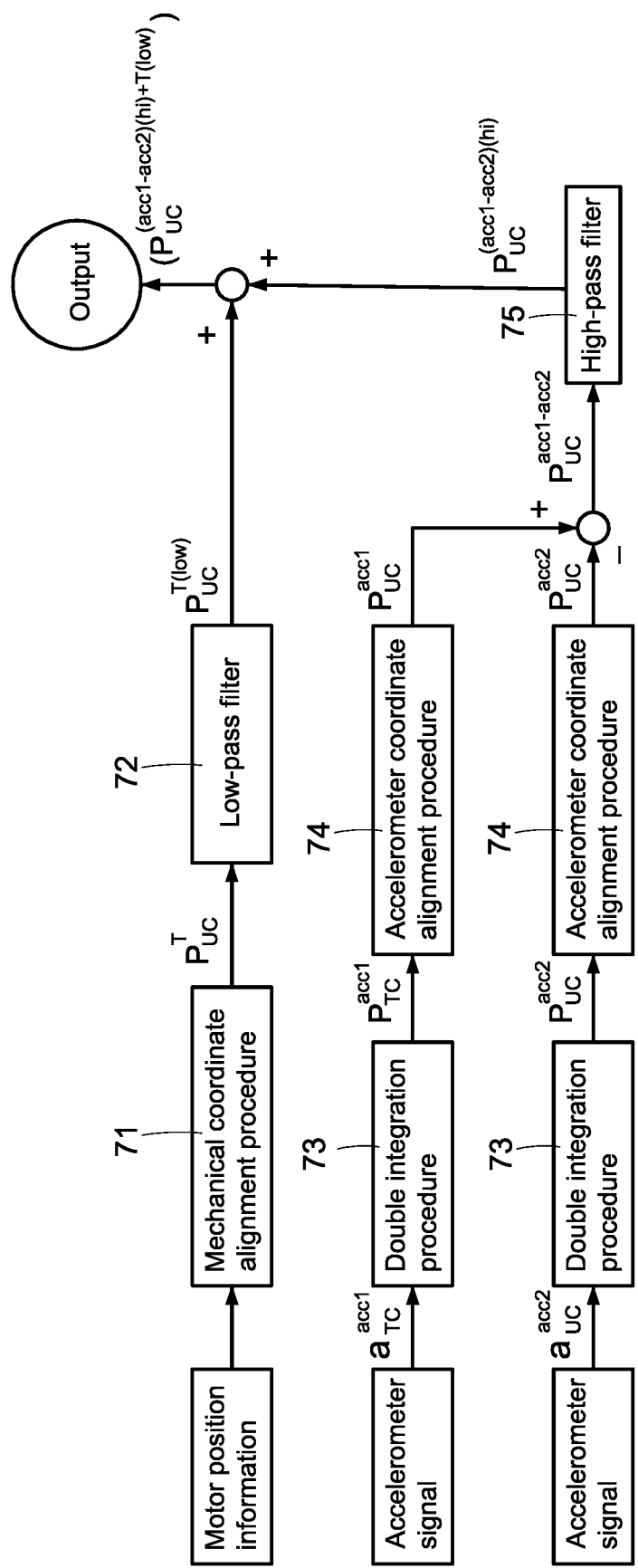
FIG. 9 shows the data fusion flowchart according to the second embodiment of the present disclosure.

Please refer to FIGS. 1, 2, 4, 7, 8 and 9, where FIG. 9 shows the data fusion flowchart according to the second embodiment of the present disclosure.

In the embodiment shown in FIG. 9, the controller 10 performs the mechanical coordinate alignment procedure 71 for the motor position information to generate the position vector $P_{UC}^{T}$ for describing the coordinate value of the tool tip 41 based on the workpiece-end coordinates system. Then the controller 10 performs filtering to the position vector $P_{UC}^{T}$ by low-pass filter 72 to generate low-frequency position vector $P_{UC}^{T(low)}$.

Different with the embodiment shown in FIG. 8, the processing machine 1 shown in FIG. 9 is provided with a plurality of accelerometers such as the first accelerometer to detect the real acceleration $a_{TC}^{acc1}$ of the tool tip 41 and the second accelerometer to detect the real acceleration $a_{UC}^{acc2}$ of the workpiece-end 3.

In this embodiment, the controller 10 performs the double integration procedure 73 to the first acceleration signal $a_{TC}^{acc1}$ output by the first accelerometer to generate the first movement information $P_{TC}^{acc1}$ for describing the position of the tool tip 41 based on the tool-end coordinates system. Besides, the controller 10 performs the accelerometer coordinate alignment procedure 74 to the first movement information $P_{TC}^{acc1}$ to generate the first transformed movement information $P_{UC}^{acc1}$ for describing the position of the tool tip 41 based on the workpiece-end coordinates system.

On the other hand, the controller 10 performs the double integration procedure 73 to the second acceleration signal $a_{UC}^{acc2}$ output by the second accelerometer to generate the second movement information $P_{UC}^{acc2}$ for describing the position of the workpiece 6 based on the workpiece-end coordinates system. Besides, the controller 10 performs the accelerometer coordinate alignment procedure 74 to the second movement information $P_{UC}^{acc2}$ to generate the second transformed movement information $P_{UC}^{acc2}$ aligned with the workpiece-end coordinates system. Notably, the position of the workpiece 6 is originally based on the workpiece-end coordinates system. Therefore, in this embodiment, the controller 10 may directly output the second movement information $P_{UC}^{acc2}$ after performing the double integration procedure 73 and skip the accelerometer coordinate alignment procedure 74.

Afterward, the controller 10 subtracts the second transformed movement information $P_{UC}^{acc2}$ from the first transformed movement information $P_{UC}^{acc1}$ to obtain the initial relative movement value $P_{UC}^{acc1-acc2}$ between the tool tip 41 and the workpiece-end 3, then the controller 10 uses the high-pass filter 75 or band-pass filter to filter the initial relative movement value $P_{UC}^{acc1-acc2}$ to obtain the high-frequency relative movement value $P_{UC}^{(acc1-acc2)(hi)}$.

Finally, the controller 10 adds the low-frequency position vector $P_{UC}^{T(low)}$ with the (high-frequency relative movement value $P_{UC}^{(acc1-acc2)(hi)}$ to obtain the relative movement value $P_{UC}^{(acc1-acc2)(hi)+T(low)}$ between the tool tip 41 and the workpiece-end 3.

In the embodiment shown in FIG. 9, the high-frequency component of the relative movement value $P_{UC}^{(acc1-acc2)(hi)+T(low)}$ is based on the acceleration signals of the two accelerometers; while the low-frequency component thereof is based on the motor position information of the motor 12. Therefore, the problem caused by the low-frequency offset of the accelerometer 5 and the failure of the motor position information of the motor 12 to predict the unexpected vibration can be prevented.

Figure 10:
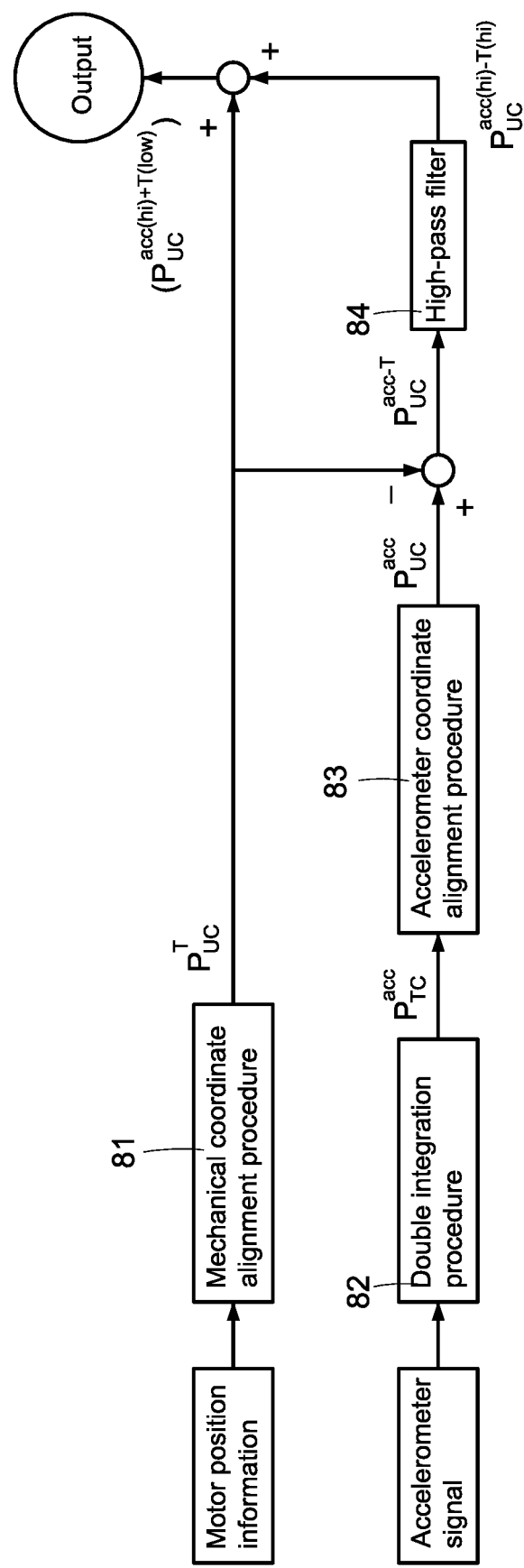
FIG. 10 shows the data fusion flowchart according to the third embodiment of the present disclosure.

Please refer to FIGS. 1, 2, 4, and 10, where FIG. 10 shows the data fusion flowchart according to the third embodiment of the present disclosure.

In the embodiment shown in FIG. 10, the controller 10 performs the mechanical coordinate alignment procedure 81 for the motor position information to generate the position vector $P_{UC}^{T}$ for describing the coordinate value of the tool tip 41 based on the workpiece-end coordinates system. On the other hand, the controller 10 performs double integration procedure 82 to the acceleration signal output by the accelerometer 5 to generate the movement information $P_{TC}^{acc}$ for describing the position of the tool tip 41 based on the tool-end coordinates system. Furthermore, the controller 10 performs the accelerometer coordinate alignment procedure 83 to the movement information $P_{TC}^{acc}$ to generate the transformed movement information $P_{UC}^{acc}$ for describing the position of the tool tip 41 based on the workpiece-end coordinates system.

In this embodiment, the controller 10 subtracts the position vector $P_{UC}^{T}$ from the transformed movement information $P_{UC}^{acc}$ to generate the mixed vector $P_{UC}^{acc-T}$. Afterward, the controller 10 uses high-pass filter 84 or band-pass filter to filter the mixed vector $P_{UC}^{acc-T}$ to generate the second high-frequency mixed vector $P_{UC}^{acc(hi)-T(hi)}$. Finally, the controller 10 adds the high-frequency mixed vector $P_{UC}^{acc(hi)-T(hi)}$ with the position vector $P_{UC}^{T}$ (namely, the position vector $P_{UC}^{T(hi)+T(low)}$) to generate the relative movement value $P_{UC}^{acc(hi)+T(low)}$ between the tool tip 41 and the workpiece-end 3.

Similar to the embodiments in FIGS. 8 and 9, the high frequency component of the relative movement value $P_{UC}^{acc(hi)+T(low)}$ in FIG. 10 is obtained from the output acceleration signal of the accelerometer 5, and the low frequency component of the relative movement value $P_{UC}^{acc(hi)+T(low)}$ is obtained from the motor position information of the motor 12. Therefore, the problem caused by the low-frequency offset of the accelerometer 5 and the failure of the motor position information to predict the unexpected vibration can be prevented.

Besides, similar to the embodiment in FIG. 9, when the processing machine 1 is provided with a plurality of accelerometers, the processing machine 1 may calculate the relative movement value $P_{UC}^{(acc1-acc2)(hi)+T(low)}$ between the tool tip 41 and the workpiece-end 3 by calculation shown in FIG. 10. The detailed description is omitted here for brevity.

According to the present disclosure, the controller may precisely calculate the relative movement value between the tool tip and the workpiece-end by the output signal of the motor and the accelerometer. The movement value includes expected movement of the tool tip in normal operation and the unexpected movement of the tool tip due to vibration. Therefore, the present disclosure may achieve on-line real time monitoring of processing status and off-line investigation for processing quality.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method for determining abnormal processing of processing machine, the method being applied to a processing machine, the processing machine comprising a tool-end and a workpiece-end corresponding to the tool-end, the tool-end being arranged with a tool and the workpiece-end being arranged with a workpiece, the tool comprising a tool tip for processing the workpiece, the method comprising:
  a) obtaining an acceleration signal from an accelerometer, the accelerometer being arranged on the tool-end and using an accelerometer coordinate system, the acceleration signal being corresponding to a real acceleration value of the tool tip;
  b) double integrating the acceleration signal to generate a movement information;
  c) performing an accelerometer coordinate alignment processing to transform the movement information in the accelerometer coordinate system to a transformed movement information in a workpiece-end coordinate system used by the workpiece-end;
  d) obtaining a motor position information, wherein the motor position information is related to at least one motor for controlling the tool-end and corresponding to a coordinate value of the tool tip in a tool-end coordinate system;
  e) performing a forward kinematics processing to the motor position information to obtain a position vector of the tool tip corresponding to the workpiece-end coordinate system;
  f) combining the transformed movement information and the position vector to obtain a relative movement value between the tool tip and the workpiece-end; and
  g) determining whether the processing machine has abnormal processing based on the relative movement value.

2. The method in claim 1, wherein the step f) further comprises:
  f11) obtaining the transformed movement information;
  f12) obtaining the position vector;
  f13) processing the transformed movement information based on a first weighting value and processing the position vector based on a second weighting value, wherein a high-frequency component of the first weighting value is larger than a low-frequency component of the first weighting value, a low-frequency component of the second weighting value is larger than a high-frequency component of the second weighting value; and
  f14) combining the processed transformed movement information and the processed position vector to obtain the relative movement value.

3. The method in claim 1, wherein the step f) further comprises:

f21) obtaining the transformed movement information and using a high-pass filter to filter the transformed movement information to obtain a high-frequency movement information;

f22) obtaining the position vector and using a low-pass filter to filter the position vector to obtain a low-frequency position vector; and f23) combining the high-frequency movement information and the low-frequency position vector to obtain the relative movement value.

4. The method in claim 1, wherein the step f) further comprises:

f31) obtaining the transformed movement information and the position vector;

f32) subtracting the position vector from the transformed movement information to obtain a mixed vector;

f33) using a high-pass filter to filter the mixed vector to generate a high-frequency mixed vector; and f34) combining the high-frequency mixed vector and the position vector to obtain the relative movement value.

5. The method in claim 1, wherein the processing machine further comprises a second accelerometer arranged on the workpiece-end, the second accelerometer uses a second accelerometer coordinate system, the method further comprising steps before the step f):

f01) obtaining a second acceleration signal from the second accelerometer and the second acceleration signal being corresponding to a real acceleration value of the workpiece-end;

f02) double integrating the second acceleration signal to generate a second movement information; and f03) performing the accelerometer coordinate alignment processing to transform the second movement information in the second accelerometer coordinate system to a second transformed movement information in the workpiece-end coordinate system;

wherein in the step f), the transformed movement information, the position vector and the second transformed movement information are combined to obtain the relative movement value.

6. A processing machine, comprising:

a workpiece-end for arranging a workpiece and using a workpiece-end coordinate system;

a tool-end for arranging a tool, the tool-end using a tool-end coordinate system and comprising a tool tip for processing the workpiece;

at least one motor connected to the tool-end and controlled to drive the tool for movement and generating a motor position information, wherein the motor position information is corresponding to a coordinate value of the tool tip in the tool-end coordinate system;

an accelerometer arranged on the tool-end and using an accelerometer coordinate system, the accelerometer being configured to detect a real acceleration value of the tool tip and generate an acceleration signal;

a driver connected to the at least one motor and the accelerometer, and configured to control the at least one motor, the driver receiving the motor position information and the acceleration signal; and a controller connected to the driver, the controller being configured to perform a double integration procedure to the acceleration signal to generate a movement information, configured to perform an accelerometer coordinate alignment processing to transform the movement information from the accelerometer coordinate system to a transformed movement information in the workpiece-end coordinate system, and configured to perform a forward kinematics processing to the motor position information to obtain a position vector of the tool tip corresponding to the workpiece-end coordinate system;

wherein the controller is configured to combine the transformed movement information and the position vector to obtain a relative movement value between the tool tip and the workpiece-end; and to determine whether the processing machine has abnormal processing based on the relative movement value.

7. The processing machine in claim 6, wherein the accelerometer coordinate alignment processing is to perform a proper Euler angles transformation based on the workpiece-end coordinates system to the movement information to generate the transformed movement information, the forward kinematics processing is configured to use Denavit-Hartenberg parameters in workpiece-end coordinates system to process the motor position information to generate the position vector.

8. The processing machine in claim 6, wherein the controller is configured to filter the transformed movement information by a high-pass filter to generate a high-frequency movement information and to filter the position vector by a low-pass filter to generate a low-frequency position vector, the controller is configured to combine the high-frequency movement information and the low-frequency position vector to obtain the relative movement value.

9. The processing machine in claim 6, wherein the controller is configured to subtract the position vector from the transformed movement information to obtain a mixed vector; to use a high-pass filter to filter the mixed vector to generate a high-frequency mixed vector, and to combine the high-frequency mixed vector and the position vector to obtain the relative movement value.

10. The processing machine in claim 6, further comprising:

a second accelerometer arranged on the workpiece-end and uses a second accelerometer coordinate system, the second accelerometer configured to detect a real acceleration value of the workpiece-end and generate a second acceleration signal;

wherein the controller is configured to perform double integrating to the second acceleration signal to generate a second movement information, and to perform the accelerometer coordinate alignment processing to transform the second movement information in the second accelerometer coordinate system to a second transformed movement information in the workpiece-end coordinate system;

wherein the controller is configured to combine the transformed movement information, the position vector and the second transformed movement information to obtain the relative movement value.

* * * * *